Patented June 23, 1936

2,045,262

UNITED STATES PATENT OFFICE 2,045,262

REFINING OF HYDROCARBON OIL

Salmen Comay, Chicago, Ill., assignor, by mesne assignments, to Universal Oil Products Company, Chicago, Ill., a corporation of Delaware No Drawing. Application November 14, 1929, Serial No. 407,273. Renewed April 27, 1934

5 Claims. (Cl. 196—26)

This invention relates to the treatment of hydrocarbon oils, in particular, petroleum distillates, especially cracked distillates, and contemplates the treatment of such distillates by heating them with metallic nitrates such as the nitrates of iron, copper, aluminum, bismuth, etc. The particular purpose of the treatment is for the removal of sulphur compounds.

Cracked petroleum distillates contain several primary groups of hydrocarbons, among which are the important unsaturated and aromatic hydrocarbons which react with sulphuric acid during the ordinary course of treatment resulting in a large loss of the distillate undergoing treatment, both by material removed and by gasoline converted into hydrocarbons of the gas oil boiling range. The present invention has for its specific purpose the reduction of the quantity of acid required for the desulphurization of cracked distillates as well as the cutting down of losses of distillate. In effecting these results, the oil to be desulphurized is refluxed for a period of 15 to 30 minutes, at a temperature of from 150 to 350° F., more or less, in the presence of a metallic nitrate, this treatment preceding the customary sulphuric acid treatment.

As an example, ferric nitrate, $Fe(NO_3)_3.9H_2O$, may be used in the proportion of one-half percent of the weight of distillate being treated. The ferric nitrate is introduced together with the oil to be treated to a still equipped with a reflux condenser and heated for the period stated. Preferably, but not necessarily, the refluxing is followed by treatment with caustic solution. This treatment facilitates the subsequent treatment of the oil with sulphuric acid. After the caustic sludge is removed, the oil is treated with sulphuric acid. For example, with a pressure distillate containing a high percentage of sulphur, from 20 to 30 lbs. of concentrated sulphuric acid, say 98% strength, is used. The acid sludge is then removed, the oil water-washed and following the water-wash, the oil is treated with caustic after the removal of the caustic the oil is subjected to distillation preferably in the presence of steam.

As an example of the effect of such treatment with metallic nitrates, the following experiments are cited. For simplicity in the following examples, since all of the oils are acid treated, those treatments which do not involve the use of nitrate are referred to as the simple treat.

*Effect of metallic nitrate*

| Pressure distillate from— | Percent sulphur in treated distillate | |
|---|---|---|
| | Simple treat | Simple treat plus metallic nitrate treat |
| Panuco | 0.30 | 0.21 ferric |
| Panuco | 0.30 | 0.22 bismuth |
| Panuco | 0.30 | 0.25 aluminum |
| Smackover | 0.20 | 0.10 ferric |
| California | 0.24 | 0.17 ferric |
| California | 0.24 | 0.14 mixed nitrates ferric and calcium |
| Venezuela | 0.33 | 0.24 ferric |

Other nitrates, e. g. aluminum, bismuth, copper, nickel, etc. show similar reductions in varying degrees. It has been found in some cases that mixed nitrates give better results than simple nitrates, for example a mixture of ferric nitrate and calcium nitrate gives results which are an improvement over the use of ferric nitrate alone.

This invention results in the production of superior products, entailing a very much smaller loss of the distillate undergoing treatment when compared with ordinary sulphuric acid treatment, and especially avoiding the loss of those hydrocarbon groups in the distillate which are most desirable for motor fuel uses.

I claim:

1. In the refining of cracked hydrocarbon distillates of motor fuel boiling range and containing sulphur and substantial proportions of unsaturated and aromatic hydrocarbons chemically reactive to sulphuric acid, the method which comprises heating such distillate with a metallic nitrate, thereafter treating the distillate with caustic solution, and then treating the distillate with sulphuric acid.

2. A process for refining sulphur-containing cracked gasoline which comprises first heating the gasoline with a metallic nitrate and subsequently treating the gasoline with sulphuric acid.

3. A process for refining sulphur-containing cracked gasoline which comprises first heating the gasoline with ferric nitrate and subsequently treating the gasoline with sulphuric acid.

4. A process for refining sulphur-containing cracked hydrocarbon distillates which comprises heating the distillate with a metallic nitrate, and then treating the distillate successively with caustic solution and sulphuric acid in the order named.

5. A process for refining sulphur-containing cracked hydrocarbon distillates which comprises heating the distillate with a mixture of ferric nitrate and calcium nitrate.

SALMEN COMAY.